(12) United States Patent
Jorwekar et al.

(10) Patent No.: US 10,975,868 B2
(45) Date of Patent: Apr. 13, 2021

(54) COMPRESSOR WITH FLOATING SEAL

(71) Applicant: Emerson Climate Technologies, Inc., Sidney, OH (US)

(72) Inventors: Pavan Pralhad Jorwekar, Ahmednagar (IN); Bharat Mahavir Shirote, Pune (IN); Vikas Ramkumar Verma, Pune (IN); Yogesh Sudhirarao Mahure, Pune (IN); Patrick R. Gillespie, Dayton, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 277 days.

(21) Appl. No.: 16/025,050

(22) Filed: Jul. 2, 2018

(65) Prior Publication Data

US 2019/0010944 A1 Jan. 10, 2019

(30) Foreign Application Priority Data

Jul. 7, 2017 (IN) .............................. 201721023952

(51) Int. Cl.
*F03C 2/00* (2006.01)
*F03C 4/00* (2006.01)
(Continued)

(52) U.S. Cl.
CPC ........ *F04C 27/001* (2013.01); *F04C 18/0215* (2013.01); *F04C 23/008* (2013.01);
(Continued)

(58) Field of Classification Search
CPC .............. F04C 18/0215; F04C 18/0253; F04C 23/008; F04C 27/001; F04C 27/008;
(Continued)

(56) References Cited

U.S. PATENT DOCUMENTS 2,294,105 A   8/1942   Wallgren
2,592,082 A   4/1952   Trumpler
(Continued)

FOREIGN PATENT DOCUMENTS

CN   1060699 A   4/1992
CN   1113547 A   12/1995
(Continued)

OTHER PUBLICATIONS

Search Report regarding European Patent Application No. EP06250074, dated Jun. 13, 2006.
(Continued)

*Primary Examiner* — Theresa Trieu
(74) *Attorney, Agent, or Firm* — Harness, Dickey & Pierce, P.L.C.

(57) ABSTRACT

A compressor may include first and second scrolls and a seal. The first scroll includes a first end plate and a first spiral wrap extending from the first end plate. The first end plate may define a discharge passage and an annular recess surrounding the discharge passage. The second scroll includes a second end plate and a second spiral wrap extending from the second end plate. The first and second spiral wraps cooperate to define a plurality of fluid pockets. The seal may be at least partially received in the annular recess and may cooperate with the first scroll to define a biasing chamber receiving fluid at an intermediate pressure. The seal may include inner and outer diametrical surfaces. The inner diametrical surface may include a plurality of first annular grooves. The outer diametrical surface may include a plurality of second annular grooves.

36 Claims, 4 Drawing Sheets

(51) Int. Cl.
*F04C 18/00* (2006.01)
*F04C 2/00* (2006.01)
*F04C 27/00* (2006.01)
*F16J 15/44* (2006.01)
*F04C 18/02* (2006.01)
*F16J 15/453* (2006.01)
*F16J 15/34* (2006.01)
*F04C 23/00* (2006.01)

(52) U.S. Cl.
CPC ............. *F04C 27/008* (2013.01); *F16J 15/34* (2013.01); *F16J 15/441* (2013.01); *F16J 15/443* (2013.01); *F16J 15/453* (2013.01)

(58) Field of Classification Search
CPC ...... F16J 5/34; F16J 5/441; F16J 5/443; F16J 5/453; F16J 15/34; F16J 15/441; F16J 15/443; F16J 15/445; F16J 15/447; F16J 15/453; F16J 15/4472–4478
See application file for complete search history.

(56) References Cited

U.S. PATENT DOCUMENTS

| | | | |
|---|---|---|---|
| 2,867,462 A | 1/1959 | Nielsen | |
| 3,306,683 A | 2/1967 | Deuring | |
| 3,511,512 A | 5/1970 | Wheelock | |
| 3,600,114 A | 8/1971 | Dvorak et al. | |
| 3,707,852 A | 1/1973 | Burckhardt et al. | |
| 4,116,452 A | 9/1978 | Schanz | |
| 4,596,520 A | 6/1986 | Arata et al. | |
| 4,655,462 A | 4/1987 | Balsells | |
| 4,669,737 A | 6/1987 | Diffenderfer | |
| 4,869,514 A | 9/1989 | Bogdanovic | |
| 4,877,382 A | 10/1989 | Caillat et al. | |
| 4,940,080 A | 7/1990 | Reeves et al. | |
| 4,993,928 A | 2/1991 | Fraser, Jr. | |
| 5,105,879 A | 4/1992 | Ross | |
| 5,156,539 A | 10/1992 | Anderson et al. | |
| 5,311,748 A | 5/1994 | Bahel et al. | |
| 5,342,183 A | 8/1994 | Rafalovich et al. | |
| 5,407,335 A * | 4/1995 | Caillat ................ | F04C 18/0215 418/55.1 |
| 5,447,418 A | 9/1995 | Takeda et al. | |
| 5,447,420 A | 9/1995 | Caillat et al. | |
| 5,494,422 A | 2/1996 | Ukai et al. | |
| 5,503,542 A | 4/1996 | Grassbaugh et al. | |
| 5,540,572 A | 7/1996 | Park et al. | |
| 5,562,435 A | 10/1996 | Cho et al. | |
| 5,588,820 A | 12/1996 | Hill et al. | |
| 5,607,288 A | 3/1997 | Wallis et al. | |
| 5,613,841 A | 3/1997 | Bass et al. | |
| 5,707,210 A | 1/1998 | Ramsey et al. | |
| 5,800,141 A | 9/1998 | Ceylan et al. | |
| 5,803,716 A | 9/1998 | Wallis et al. | |
| 5,921,761 A | 7/1999 | Eckels | |
| 6,027,321 A | 2/2000 | Shim et al. | |
| 6,048,184 A | 4/2000 | Chang et al. | |
| 6,059,549 A | 5/2000 | Tarng et al. | |
| 6,077,057 A | 6/2000 | Hugenroth et al. | |
| 6,095,765 A | 8/2000 | Khalifa | |
| 6,135,739 A | 10/2000 | Ogawa et al. | |
| 6,146,119 A | 11/2000 | Bush et al. | |
| 6,164,660 A * | 12/2000 | Goodman ................ | F16J 15/32 277/309 |
| 6,171,088 B1 | 1/2001 | Sun et al. | |
| 6,267,565 B1 | 7/2001 | Seibel et al. | |
| 6,821,092 B1 | 11/2004 | Gehret et al. | |
| 6,913,448 B2 | 7/2005 | Liang et al. | |
| 6,984,115 B1 | 1/2006 | Tarng et al. | |
| 7,070,401 B2 | 7/2006 | Clendenin et al. | |
| 7,140,851 B2 | 11/2006 | Tarng | |
| 7,338,265 B2 | 3/2008 | Grassbaugh et al. | |
| 7,491,045 B2 | 2/2009 | Masuda | |
| 7,543,822 B2 * | 6/2009 | Grimanis ............. | F16J 15/3224 277/500 |
| 7,568,897 B2 | 8/2009 | Grassbaugh et al. | |
| 7,611,345 B2 | 11/2009 | Huang et al. | |
| 8,287,257 B2 | 10/2012 | Dunaevsky | |
| 8,932,036 B2 | 1/2015 | Monnier et al. | |
| 2002/0026806 A1 | 3/2002 | Tsuboe et al. | |
| 2003/0012659 A1 | 1/2003 | Seibel et al. | |
| 2003/0063982 A1 | 4/2003 | Pham | |
| 2004/0071571 A1 | 4/2004 | Uchida et al. | |
| 2004/0136854 A1 | 7/2004 | Kimura et al. | |
| 2005/0123428 A1 | 6/2005 | Uchida et al. | |
| 2005/0142017 A1 | 6/2005 | Liang et al. | |
| 2005/0265880 A1 | 12/2005 | Chang et al. | |
| 2006/0198748 A1 | 9/2006 | Grassbaugh et al. | |
| 2007/0036661 A1 | 2/2007 | Stover | |
| 2007/0224071 A1 | 9/2007 | Wang | |
| 2008/0101972 A1 | 5/2008 | Tarng et al. | |
| 2008/0159895 A1 | 7/2008 | Huang et al. | |
| 2009/0060767 A1 | 3/2009 | Zamudio | |
| 2009/0098001 A1 | 4/2009 | Ni | |
| 2009/0169405 A1 | 7/2009 | Suefuji et al. | |
| 2009/0185926 A1 | 7/2009 | Bush | |
| 2009/0185935 A1 | 7/2009 | Seibel et al. | |
| 2009/0246059 A1 | 10/2009 | Nakamura et al. | |
| 2010/0254841 A1 | 10/2010 | Akei et al. | |
| 2010/0303659 A1 | 12/2010 | Stover et al. | |
| 2011/0293456 A1 | 12/2011 | Seibel et al. | |
| 2012/0258002 A1 | 10/2012 | Rose | |
| 2014/0023541 A1 * | 1/2014 | Heidecker ........... | F04C 18/0215 418/55.4 |
| 2014/0271306 A1 | 9/2014 | Kim et al. | |

FOREIGN PATENT DOCUMENTS

| | | |
|---|---|---|
| CN | 1184894 A | 6/1998 |
| CN | 1286358 A | 3/2001 |
| CN | 1415913 A | 5/2003 |
| CN | 1576605 A | 2/2005 |
| CN | 1828022 A | 9/2006 |
| CN | 101046204 A | 10/2007 |
| CN | 102449313 A | 5/2012 |
| CN | 203214294 U | 9/2013 |
| CN | 104061157 A | 9/2014 |
| EP | 0482209 A1 | 4/1992 |
| EP | 0747598 A2 | 12/1996 |
| JP | H05149269 A | 6/1993 |
| JP | H08296572 A | 11/1996 |
| RU | 2064050 C1 | 7/1996 |

OTHER PUBLICATIONS

International Search Report regarding International Patent Application No. PCT/US2011/058128, dated Apr. 10, 2012.

Written Opinion of the International Searching Authority regarding International Patent Application No. PCT/US2011/058128, dated Apr. 10, 2012.

Office Action regarding U.S. Appl. No. 13/283,097, dated Jan. 30, 2014.

Office Action regarding Russian Patent Application No. 2013124425, dated Jun. 9, 2014. Translation provided by Gowlings International Inc.

Office Action regarding U.S. Appl. No. 13/283,097, dated Jul. 9, 2014.

Office Action regarding Chinese Patent Application No. 201180052695.2, dated Feb. 2, 2015. Translation provided by Unitalen Attorneys at Law.

Office Action regarding Chinese Patent Application No. 201180052695.2, dated Oct. 9, 2015. Translation provided by Unitalen Attorneys at Law.

Office Action regarding Chinese Patent Application No. 201180052695.2, dated Mar. 17, 2016. Translation provided by Unitalen Attorneys at Law.

Search Report regarding European Patent Application No. 11837109.5, dated Jun. 8, 2016.

(56) References Cited

OTHER PUBLICATIONS

Office Action regarding European Patent Application No. 11837109.5, dated Nov. 17, 2017.
Office Action regarding Chinese Patent Application No. 201606087864, dated Jan. 23, 2018. Translation provided by Unitalen Attorneys at Law.
Office Action regarding Indian Patent Application No. 735/MUMNP/2013, dated Jun. 6, 2018.
Office Action regarding Chinese Patent Application No. 201610608786.4, dated Sep. 10, 2018. Translation provided by Unitalen Attorneys at Law.
Office Action regarding Chinese Patent Application No. 201810735714.5, dated Jun. 3, 2019. Translation provided by Unitalen Attorneys at Law.
Office Action regarding European Patent Application No. 11837109.5, dated Jun. 18, 2019.
Office Action regarding Chinese Patent Application No. 201810735714.5, dated Nov. 27, 2019. Translation provided by Unitalen Attorneys at Law.
Office Action regarding Indian Patent Application No. 201721023952, dated Nov. 27, 2019.
Office Action regarding European Patent Application No. 11837109.5, dated Mar. 9, 2020.
Office Action regarding Indian Patent Application No. 201824024885, dated Aug. 11, 2020.
U.S. Appl. No. 16/864,987, filed May 1, 2020, James W. McBean et al.
U.S. Appl. No. 15/930,616, filed May 13, 2020, Yogesh S. Mahure.
U.S. Appl. No. 16/883,323, filed May 26, 2020, James A. Schaefer et al.

* cited by examiner

COMPRESSOR WITH FLOATING SEAL

CROSS-REFERENCE TO RELATED APPLICATIONS

This application claims the benefit and priority of Indian Patent Application No. 201721023952, filed on Jul. 7, 2017. The entire disclosure of the above application is incorporated herein by reference.

FIELD

The present disclosure relates to a compressor with a floating seal.

BACKGROUND

This section provides background information related to the present disclosure and is not necessarily prior art.

A climate-control system (e.g., a heat-pump system, an air-conditioning system, a refrigeration system, etc.) may include a fluid circuit having an outdoor heat exchanger, an indoor heat exchanger, an expansion device disposed between the indoor and outdoor heat exchangers, and a compressor circulating a working fluid (e.g., refrigerant or carbon dioxide) between the indoor and outdoor heat exchangers. Efficient and reliable operation of the compressor is desirable to ensure that the climate-control system in which the compressor is installed is capable of effectively and efficiently providing a cooling and/or heating effect on demand.

SUMMARY

This section provides a general summary of the disclosure, and is not a comprehensive disclosure of its full scope or all of its features.

The present disclosure provides a compressor that may include a first scroll, a second scroll, and a seal (e.g., a floating seal). The first scroll may include a first end plate and a first spiral wrap extending from the first end plate. The first end plate may define a biasing passage, a discharge passage and a first annular recess surrounding the discharge passage. The second scroll may include a second end plate and a second spiral wrap extending from the second end plate. The first and second spiral wraps may cooperate to define a plurality of fluid pockets therebetween. The fluid pockets decrease in volume as the fluid pockets move from a radially outer position to a radially intermediate position to a radially inner position. The seal may be at least partially received in the annular recess and may cooperate with the first scroll to define a biasing chamber. The biasing chamber may be in communication with one of the fluid pockets via the biasing passage when the one of the fluid pockets is at the radially intermediate position. The seal may include an annular body having an inner diametrical surface and an outer diametrical surface. The inner diametrical surface may include a plurality of first annular grooves formed therein. The outer diametrical surface may include a plurality of second annular grooves formed therein.

In some configurations of the compressor of the above paragraph, the first annular recess is defined by a first diametrical surface of the first scroll and a second diametrical surface of the first scroll. The first diametrical surface may surround the discharge passage. The second diametrical surface may surround the first diametrical surface. The seal may be disposed radially between the first and second diametrical surfaces of the first scroll.

In some configurations, the compressor of one or more of the above paragraphs includes a shell assembly and a partition. The shell assembly may define a suction-pressure region and a discharge-pressure region. The partition is disposed within the shell assembly and separates the suction-pressure region from the discharge-pressure region. The seal may sealingly engage the partition.

In some configurations of the compressor of one or more of the above paragraphs, the seal includes an annular lip or protrusion that extends axially toward the partition and sealingly engages the partition.

In some configurations of the compressor of one or more of the above paragraphs, the inner diametrical surface of the seal cooperates with the first diametrical surface of the first scroll to define a first leakage path between the discharge-pressure region and the biasing chamber.

In some configurations of the compressor of one or more of the above paragraphs, the outer diametrical surface of the seal may cooperate with the second diametrical surface of the first scroll to define a second leakage path between the biasing chamber and the suction-pressure region.

In some configurations of the compressor of one or more of the above paragraphs, the first leakage path includes the first annular grooves formed in the seal such that fluid from the discharge-pressure region is able to flow into the first annular grooves.

In some configurations of the compressor of one or more of the above paragraphs, the second leakage path includes the second annular grooves formed in the seal such that fluid from the biasing chamber is able to flow into the second annular grooves.

In some configurations of the compressor of one or more of the above paragraphs, the first and second annular grooves have trapezoidal cross sections.

In some configurations of the compressor of one or more of the above paragraphs, the seal includes a second annular recess disposed radially between the inner and outer diametrical surfaces of the seal. The second annular recess may form a portion of the biasing chamber.

In some configurations of the compressor of one or more of the above paragraphs, the seal is formed from a metallic material.

In some configurations of the compressor of one or more of the above paragraphs, the seal includes a polymeric coating.

In some configurations of the compressor of one or more of the above paragraphs, the seal is a single, unitary body.

In some configurations of the compressor of one or more of the above paragraphs, the first scroll is axially movable relative to the seal.

In some configurations of the compressor of one or more of the above paragraphs, the compressor includes a first O-ring disposed within one of the first annular grooves and a second O-ring disposed within one of the second annular grooves.

In another form, the present disclosure provides a compressor that may include a first scroll, a second scroll, and a one-piece seal (e.g., a floating seal). The first scroll may include a first end plate and a first spiral wrap extending from the first end plate. The first end plate may define a discharge passage and a first annular recess surrounding the discharge passage. The second scroll may include a second end plate and a second spiral wrap extending from the second end plate. The first and second spiral wraps may cooperate to define a plurality of fluid pockets therebetween.

The seal may be at least partially received in the first annular recess and may cooperate with the first scroll to define a biasing chamber receiving fluid at an intermediate pressure that is less than a discharge pressure and greater than a suction pressure. The seal may include a plurality of first annular grooves and a plurality of second annular grooves. The first annular grooves may surround the discharge passage. The second annular grooves are disposed radially outward relative to the first annular grooves.

In some configurations of the compressor of the above paragraph, the first annular recess is defined by a first diametrical surface of the first scroll and a second diametrical surface of the first scroll. The first diametrical surface may surround the discharge passage. The second diametrical surface may surround the first diametrical surface. The seal is disposed radially between the first and second diametrical surfaces of the first scroll.

In some configurations, the compressor of one or more of the above paragraphs includes a shell assembly and a partition. The shell assembly may define a suction-pressure region and a discharge-pressure region. The partition is disposed within the shell assembly and separates the suction-pressure region from the discharge-pressure region. The seal may sealingly engage the partition.

In some configurations of the compressor of one or more of the above paragraphs, the seal includes an annular lip that extends axially toward the partition and sealingly engages the partition.

In some configurations of the compressor of one or more of the above paragraphs, an inner diametrical surface of the seal cooperates with the first diametrical surface of the first scroll to define a first leakage path between the discharge-pressure region and the biasing chamber.

In some configurations of the compressor of one or more of the above paragraphs, an outer diametrical surface of the seal cooperates with the second diametrical surface of the first scroll to define a second leakage path between the biasing chamber and the suction-pressure region.

In some configurations of the compressor of one or more of the above paragraphs, the first leakage path includes the first annular grooves formed in the seal such that fluid from the discharge-pressure region is able to flow into the first annular grooves.

In some configurations of the compressor of one or more of the above paragraphs, the second leakage path includes the second annular grooves formed in the seal such that fluid from the biasing chamber is able to flow into the second annular grooves.

In some configurations of the compressor of one or more of the above paragraphs, the first and second annular grooves have trapezoidal cross sections.

In some configurations of the compressor of one or more of the above paragraphs, the seal includes a second annular recess disposed radially between the inner and outer diametrical surfaces of the seal. The second annular recess may form a portion of the biasing chamber.

In some configurations of the compressor of one or more of the above paragraphs, the seal is formed from a metallic material.

In some configurations of the compressor of one or more of the above paragraphs, the seal includes a polymeric coating.

In some configurations of the compressor of one or more of the above paragraphs, the seal is formed from a first material (such as a metallic material, for example) and includes a coating comprising a second material (such as a polymeric material, for example) that is different than the first material.

In some configurations of the compressor of one or more of the above paragraphs, the first scroll is axially movable relative to the seal.

In some configurations, the compressor of one or more of the above paragraphs includes a first O-ring disposed within one of the first annular grooves and a second O-ring disposed within one of the second annular grooves.

In another form the present disclosure provides a compressor that may include a first scroll, a second scroll, and a seal. The first scroll may include a first end plate and a first spiral wrap extending from the first end plate. The first end plate may define a biasing passage, a discharge passage and a first annular recess surrounding the discharge passage. The first annular recess may include a first diametrical surface and a second diametrical surface. The second diametrical surface may be disposed radially outward relative to the first diametrical surface. The second scroll may include a second end plate and a second spiral wrap extending from the second end plate. The first and second spiral wraps cooperate to define a plurality of fluid pockets therebetween. The fluid pockets may decrease in volume as the fluid pockets move from a radially outer position to a radially intermediate position to a radially inner position. The seal may be at least partially received in the first annular recess radially between the first and second diametrical surfaces of the first annular recess. The seal and the first scroll may cooperate with each other to define a biasing chamber. The biasing chamber may be communication with one of the fluid pockets via the biasing passage when the one of the fluid pockets is at the radially intermediate position. The seal may include an annular body having an inner diametrical surface and an outer diametrical surface. A plurality of first annular grooves may be formed in one of the first diametrical surface of the first scroll and the inner diametrical surface of the seal. A plurality of second annular grooves may be formed in one of the second diametrical surface of the first scroll and the outer diametrical surface of the seal.

In some configurations of the compressor of the above paragraph, the first annular grooves are formed in the first diametrical surface of the first scroll and the second annular grooves are formed in the second diametrical surface of the first scroll.

In some configurations of the compressor of one or more of the above paragraphs, the first annular grooves are formed in the inner diametrical surface of the seal and the second annular grooves are formed in the outer diametrical surface of the seal.

In some configurations of the compressor of one or more of the above paragraphs, the compressor includes a shell assembly and a partition. The shell assembly may define a suction-pressure region and a discharge-pressure region. The partition is disposed within the shell assembly and separates the suction-pressure region from the discharge-pressure region. The seal may sealingly engage the partition.

In some configurations of the compressor of one or more of the above paragraphs, the seal includes an annular lip or protrusion that extends axially toward the partition and sealingly engages the partition.

In some configurations of the compressor of one or more of the above paragraphs, the inner diametrical surface of the seal cooperates with the first diametrical surface of the first scroll to define a first leakage path between the discharge-pressure region and the biasing chamber.

In some configurations of the compressor of one or more of the above paragraphs, the outer diametrical surface of the seal may cooperate with the second diametrical surface of the first scroll to define a second leakage path between the biasing chamber and the suction-pressure region.

In some configurations of the compressor of one or more of the above paragraphs, the first leakage path includes the first annular grooves such that fluid from the discharge-pressure region is able to flow into the first annular grooves.

In some configurations of the compressor of one or more of the above paragraphs, the second leakage path includes the second annular grooves formed such that fluid from the biasing chamber is able to flow into the second annular grooves.

In some configurations of the compressor of one or more of the above paragraphs, the first and second annular grooves have trapezoidal cross sections.

In some configurations of the compressor of one or more of the above paragraphs, the seal includes a second annular recess disposed radially between the inner and outer diametrical surfaces of the seal. The second annular recess may form a portion of the biasing chamber.

In some configurations of the compressor of one or more of the above paragraphs, the seal is formed from a metallic material.

In some configurations of the compressor of one or more of the above paragraphs, the seal includes a polymeric coating.

In some configurations of the compressor of one or more of the above paragraphs, the seal is a single, unitary body.

In some configurations of the compressor of one or more of the above paragraphs, the first scroll is axially movable relative to the seal.

In some configurations, the compressor of one or more of the above paragraphs includes a first O-ring disposed within one of the first annular grooves and a second O-ring disposed within one of the second annular grooves.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
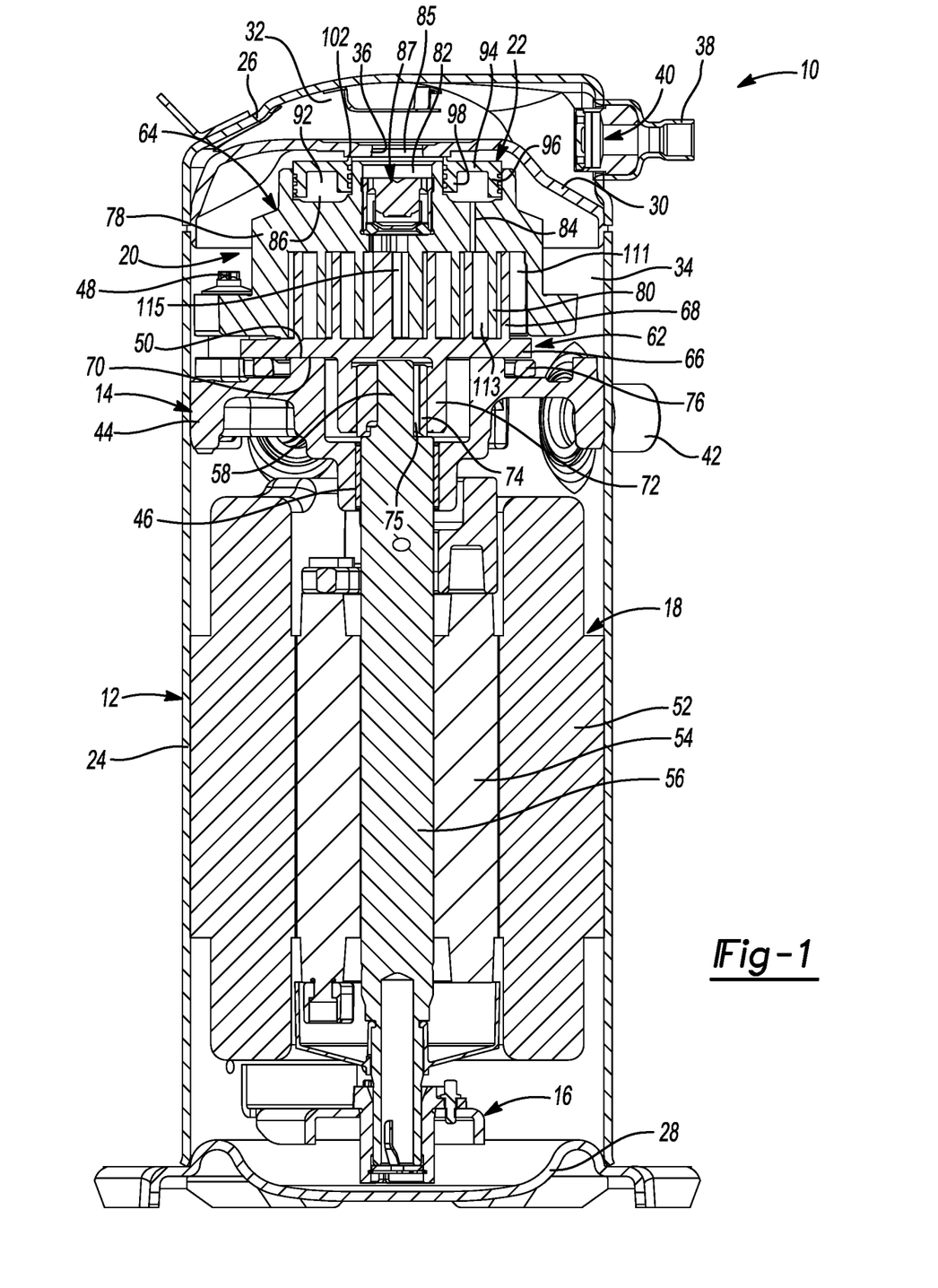
FIG. 1 is a cross-sectional view of a compressor having a floating seal according to the principles of the present disclosure.
Figure 2:
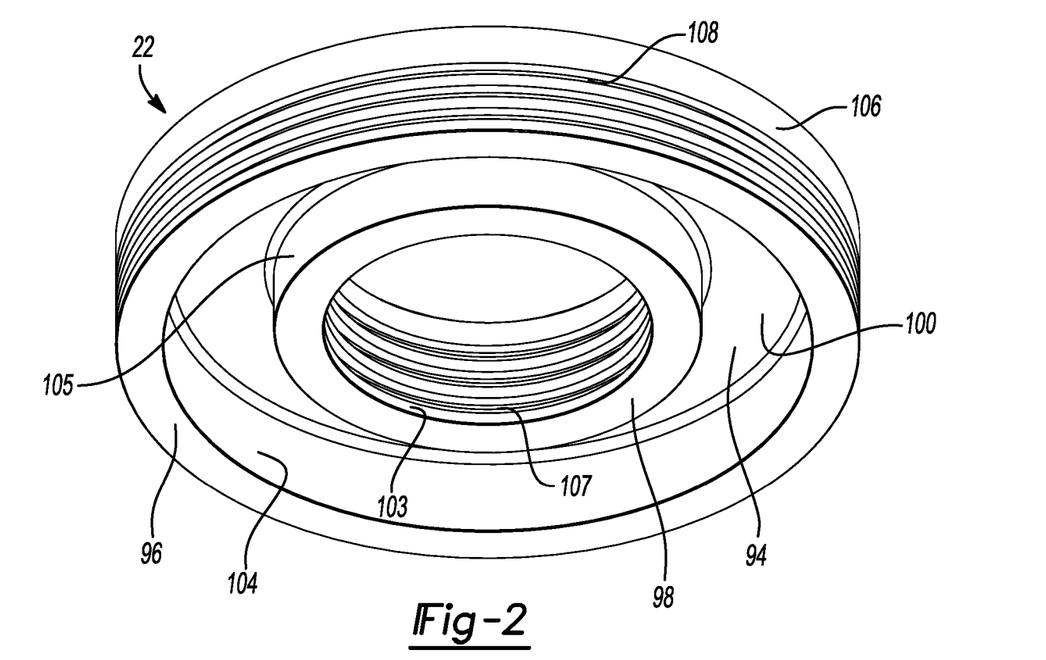
FIG. 2 is a perspective view of the floating seal.
Figure 3:
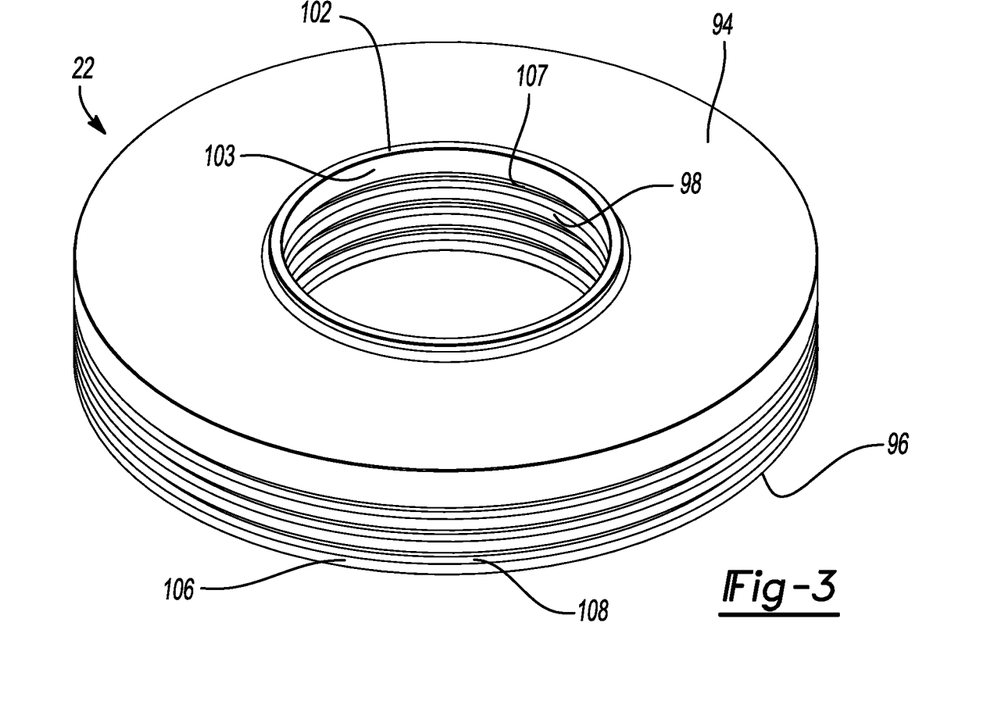
FIG. 3 is another perspective view of the floating seal.
Figure 4:
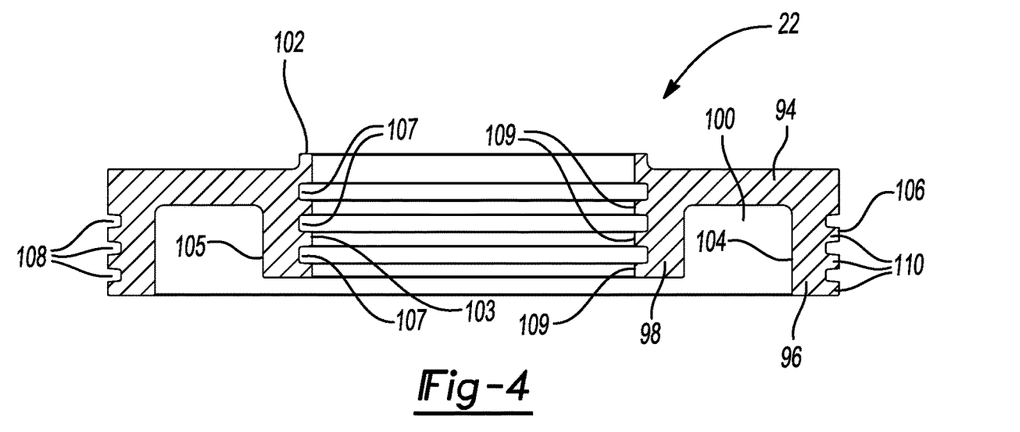
FIG. 4 is a cross-sectional view of the floating seal.

With reference to FIG. 1, a compressor 10 is provided that may include a hermetic shell assembly 12, a first bearing housing assembly 14, a second bearing housing assembly 16, a motor assembly 18, a compression mechanism 20, and a floating seal 22.

The shell assembly 12 may form a compressor housing and may include a cylindrical shell 24, an end cap 26 at an upper end thereof, and a base 28 at a lower end thereof. A partition 30 may engage the shell 24 and/or the end cap 26 and may extend across an interior volume of the shell assembly 12. The end cap 26 and the partition 30 may define a discharge chamber 32. The partition 30 may separate the discharge chamber 32 from a suction chamber (i.e., a suction-pressure region) 34 defined by the shell 24. The partition 30 may include a discharge passage 36 extending therethrough to provide communication between the compression mechanism 20 and the discharge chamber 32. A discharge fitting 38 may be attached to shell assembly 12 at an opening in the end cap 26. A discharge valve assembly 40 may be disposed within the discharge fitting 38 and may generally prevent a reverse flow condition. A suction inlet fitting 42 may be attached to shell assembly 12 at an opening in the shell 24.

The first bearing housing assembly 14 may be fixed relative to the shell assembly 12 and may include a main bearing housing 44, a first bearing 46, fasteners 48, and sleeve guides or bushings (not shown). The main bearing housing 44 may house the first bearing 46 therein and may define an annular flat thrust bearing surface 50 on an axial end surface thereof. The main bearing housing 44 may include apertures (not shown) that receive the fastener 48.

The motor assembly 18 may include a motor stator 52, a rotor 54, and a drive shaft 56. The motor stator 52 may be fixed to the shell 24. The rotor 54 may be press fit on the drive shaft 56 and may transmit rotational power to the drive shaft 56. The drive shaft 56 may be rotatably supported by the first and second bearing housing assemblies 14, 16. The drive shaft 56 may include an eccentric crank pin 58.

The compression mechanism 20 may include a pair of scroll members such as an orbiting scroll 62 and a non-orbiting scroll 64, for example. In some configurations, the scroll members could be a pair of co-rotating scrolls. The orbiting scroll 62 may include an end plate 66 having a spiral wrap 68 on an upper surface thereof and an annular flat thrust surface 70 on a lower surface. The thrust surface 70 may interface with the annular flat thrust bearing surface 50 on the main bearing housing 44. A cylindrical hub 72 may project downwardly from thrust surface 70 and may include a drive bushing 74 disposed therein. The drive bushing 74 may include an inner bore 75 in which the crank pin 58 is drivingly disposed. A flat surface on the crank pin 58 may drivingly engage a flat surface in a portion of the inner bore 75 to provide a radially compliant driving arrangement. An Oldham coupling 76 may be engaged with the orbiting scroll 62 and the main bearing housing 44 or with the orbiting and non-orbiting scrolls 62, 64 to prevent relative rotation between the orbiting and non-orbiting scrolls 62, 64.

The non-orbiting scroll 64 may include an end plate 78 and a spiral wrap 80 projecting downwardly from the end plate 78. The spiral wrap 80 may meshingly engage the spiral wrap 68 of the orbiting scroll 62, thereby creating a series of moving fluid pockets (i.e., compression pockets). The fluid pockets defined by the spiral wraps 68, 80 may decrease in volume as they move from a radially outer position (at a suction pressure) 111 to a radially intermediate position (at an intermediate pressure) 113 to a radially inner position (at a discharge pressure) 115 throughout a compression cycle of the compression mechanism 20.

The end plate 78 may include a discharge passage 82, an intermediate passage (or biasing passage) 84, and an annular recess 86. The discharge passage 82 is in communication with one of the fluid pockets at the radially inner position 115 and allows compressed working fluid (at the discharge pressure) to flow through the discharge passage 36 in the partition 30 and into the discharge chamber 32. In this manner, the discharge passages 82, 36 and the discharge chamber 32 may cooperate to define a discharge-pressure region 85. A discharge valve assembly 87 may be disposed within the discharge passage 82 to allow fluid flow from the fluid pocket at the radially inner position 115 to the discharge-pressure region 85 and prevent fluid flow from the discharge-pressure region 85 to the fluid pocket at the radially inner position 115.

Figure 5:
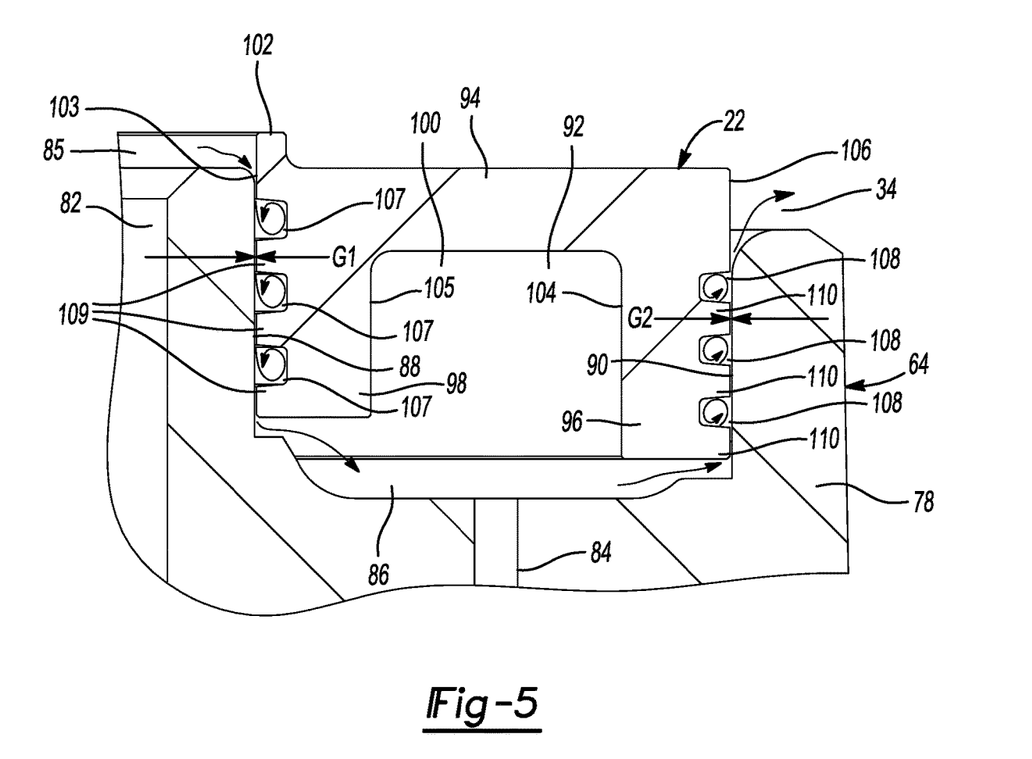
FIG. 5 is a partial cross-sectional view of the floating seal and a scroll of the compressor.

The intermediate passage 84 may provide communication between one of the fluid pockets at the radially intermediate position 113 and the annular recess 86. The annular recess 86 may surround (i.e., encircle) the discharge passage 82. As shown in FIG. 5, the annular recess 86 may include a first diametrical surface 88 and a second diametrical surface 90. The first diametrical surface 88 surrounds the discharge passage 82, and the second diametrical surface 90 surrounds the first diametrical surface 88 and the discharge passage 82 (i.e., the second diametrical surface 90 is disposed radially outward relative to the first diametrical surface 88).

The annular recess 86 may at least partially receive the seal 22 and may cooperate with the seal 22 to define an annular biasing chamber 92 therebetween. The biasing chamber 92 receives intermediate-pressure fluid (e.g., fluid at a pressure less than discharge pressure and higher than suction pressure) from the fluid pocket in the intermediate position 113 through the intermediate passage 84. A pressure differential between the intermediate-pressure fluid in the biasing chamber 92 and fluid in the suction-pressure region 34 exerts a net axial biasing force on the non-orbiting scroll 64 urging the non-orbiting scroll 64 toward the orbiting scroll 62 in an axial direction (i.e., in a direction along or parallel to the rotational axis of the drive shaft 56). In this manner, the tips of the spiral wrap 80 of the non-orbiting scroll 64 are urged into sealing engagement with the end plate 66 of the orbiting scroll 62 and the end plate 78 of the non-orbiting scroll 64 is urged into sealing engagement with the tips of the spiral wrap 68 of the orbiting scroll 62.

The fasteners 48 extend through apertures in the end plate 78 of the non-orbiting scroll and through the sleeve guides or bushings (not shown; e.g., similar or identical to the bushings disclosed in Assignee's commonly owned U.S. Pat. No. 7,070,401, the disclosure of which is incorporated by reference herein) and may threadably engage apertures in the main bearing housing 44. The sleeve guides may allow for limited axial movement of the non-orbiting scroll 64 relative to the orbiting scroll 62 and relative to the seal 22.

Referring now to FIGS. 2-5, the seal 22 may be an annular, one-piece member (i.e., a single, unitary body). The seal 22 may be formed from a metallic material or a polymeric material, for example. In some configurations, some or all of the seal 22 may be coated in a different material, such as a different polymeric, ceramic or metallic material (e.g., TEFLON (polytetrafluoroethylene), VESPEL (i.e., polymide containing graphite; manufactured by DuPont), bronze (e.g., bismuth bronze, bronze with graphite, bronze with silicone, etc.), aluminum bronze, cast iron, ceramic, polyarletherketone (PAEK) group materials (e.g., resins including polyetheretherketone (PEEK), polyetherketone (PEK), polyetheretherketone (PEEEK), polyetherketoneketone (PEKK), polyetheretherketoneketone (PEEKK), polyetherketoneetheretherketone (PEKEEK), polyetheretherketoneetheretherketone (PEEKEEK), or combinations thereof), polyamideimide (PAI) (e.g., Torlon®, manufactured by Solvay), polyphenylene sulfide (PPS), or polyphthalamide (PPA), or any other suitable material), for example, to improve the durability of the seal 22 and/or to improve the ability of the seal 22 to seal against the non-orbiting scroll 64 and/or the partition 30.

The seal 22 may include an annular body 94 having an annular outer rim 96 and an annular inner hub 98. The annular body 94 extends radially (i.e., in a direction perpendicular to the rotational axis of the drive shaft 56) between the outer rim 96 and the inner hub 98. The outer rim 96 and the inner hub 98 may extend from the body 94 in the same axial direction (i.e., in a direction along or parallel to the rotational axis of the drive shaft 56) toward the orbiting scroll 62, as shown in FIG. 1. In this manner, the outer rim 96 and the inner hub 98 cooperate to define an annular recess 100. The annular recess 100 may partially define the biasing chamber 92. An annular lip or protrusion 102 may extend from the inner hub 98 in an axial direction toward the partition 30 and may sealingly engage the partition 30.

The inner hub 98 may include an inner diametrical surface 103 and an outer diametrical surface 105. In some configurations, the inner diametrical surface 103 may be a radially innermost surface of the seal 22. As shown in FIG. 5, the inner diametrical surface 103 may face the first diametrical surface 88 of the non-orbiting scroll 64 and may be in contact with the first diametrical surface 88 or slightly spaced apart from the first diametrical surface 88 by a small annular gap G1 (e.g., an annular gap having a radial width of 0.06 mm or less). A plurality of first annular grooves 107 may be formed in the inner diametrical surface 103. In the configuration shown in the figures, the first annular grooves 107 have trapezoidal cross-sectional shapes. In other configurations, the first annular grooves 107 could have other cross-sectional shapes, such as rectangular, semicircular, triangular, or lobed (e.g., one or more straight sides and one or more curved sides), for example.

The inner diametrical surface 103 may define a plurality of first teeth 109. The first teeth 109 are axially spaced apart from each other by respective first annular grooves 107. Some or all of the first teeth 109 may be disposed within the annular recess 86 of the non-orbiting scroll 64 (or disposed between the upper and lower axial ends of the first diametrical surface 88) and may be in contact with the first diametrical surface 88 or slightly spaced apart from the first diametrical surface 88 by the annular gap G1.

The outer rim 96 may include an inner diametrical surface 104 and an outer diametrical surface 106. In some configurations, the outer diametrical surface 106 may be a radially outermost surface of the seal 22. As shown in FIG. 5, the outer diametrical surface 106 may face the second diametrical surface 90 of the non-orbiting scroll 64 and may be in contact with the second diametrical surface 90 or slightly spaced apart from the second diametrical surface 90 by a small annular gap G2 (e.g., an annular gap having a radial width of 0.06 mm or less). A plurality of second annular grooves 108 may be formed in the outer diametrical surface 106. In the configuration shown in the figures, the second annular grooves 108 have trapezoidal cross-sectional shapes. In other configurations, the second annular grooves 108 could have other cross-sectional shapes, such as rectangular, semicircular, triangular, or lobed (e.g., one or more straight sides and one or more curved sides), for example.

The outer diametrical surface 106 may define a plurality of second teeth 110. The second teeth 110 are axially spaced apart from each other by respective second annular grooves 108. Some or all of the second teeth 110 may be disposed within the annular recess 86 of the non-orbiting scroll 64 (or disposed between the upper and lower axial ends of the second diametrical surface 90) and may be in contact with the second diametrical surface 90 or slightly spaced apart from the second diametrical surface 90 by the annular gap G2.

As shown in FIG. 5, the annular gap G1 defines a first leakage path from the discharge-pressure region 85 to the biasing chamber 92. That is, the inner diametrical surface 103 of the inner hub 98 may cooperate with the first diametrical surface 88 of the non-orbiting scroll 64 to define the first leakage path, which extends from the discharge-pressure region 85 to the biasing chamber 92. Some or all of the fluid flowing through the first leakage path may flow into the first annular grooves 107 and may swirl within the first annular grooves 107. The radial width of the annular gap G1 may be sufficiently small so as to allow only a small amount of fluid communication between the discharge-pressure region 85 and the biasing chamber 92. The amount of fluid communication between the discharge-pressure region 85 and the biasing chamber 92 may be sufficiently small so as to result in a negligible amount of performance loss (e.g., the fluid communication between the discharge-pressure region 85 and the biasing chamber 92 causes a negligible amount of compressor capacity loss). The teeth 109 and first annular grooves 107 cooperate to make the first leakage path a tortuous path through which the fluid must travel between the discharge-pressure region 85 and the biasing chamber 92. This tortuous path and the turbulent swirling flow within the first annular grooves 107 reduce the amount of fluid that can flow through the first leakage path.

Similarly, the annular gap G2 defines a second leakage path from the biasing chamber 92 to the suction-pressure region 34. That is, the outer diametrical surface 106 of the outer rim 96 may cooperate with the second diametrical surface 90 of the non-orbiting scroll 64 to define the second leakage path, which extends from the biasing chamber 92 to the suction-pressure region 34. Some or all of the fluid flowing through the second leakage path may flow into the second annular grooves 108 and may swirl within the second annular grooves 108. The radial width of the annular gap G2 may be sufficiently small so as to allow only a small amount of fluid communication between the biasing chamber 92 and the suction-pressure region 34. The amount of fluid communication between the biasing chamber 92 and the suction-pressure region 34 may be sufficiently small so as to result in a negligible amount of performance loss (e.g., the fluid communication between the biasing chamber 92 and the suction-pressure region 34 causes a negligible amount of compressor capacity loss). The teeth 110 and second annular grooves 108 cooperate to make the second leakage path a tortuous path through which the fluid must travel between the biasing chamber 92 and the suction-pressure region 34. This tortuous path and the turbulent swirling flow within the second annular grooves 108 reduce the amount of fluid that can flow through the second leakage path.

In this manner, the seal 22 sufficiently fluidly separates the discharge-pressure region 85 from the biasing chamber 92 and sufficiently fluidly separates the biasing chamber 92 from the suction-pressure region 34 with little or no contact between the seal 22 and the non-orbiting scroll 64. Therefore, there is very little or no friction between the seal 22 and the non-orbiting scroll 64. This lack of friction reduces wear and extends the life of the seal 22 and the non-orbiting scroll 64. Furthermore, the one-piece design of the seal 22 simplifies assembly of the compressor 10 and reduces the number of components of the compressor 10, which reduces cost.

In the configuration shown in the figures, the annular grooves 107, 108 do not have O-rings or other seals disposed therein. In other configurations, however, one or more of the annular grooves 107, 108 could include one or more O-rings or other annular seals disposed therein that may sealingly contact the non-orbiting scroll 64 and the seal 22.

Figure 6:
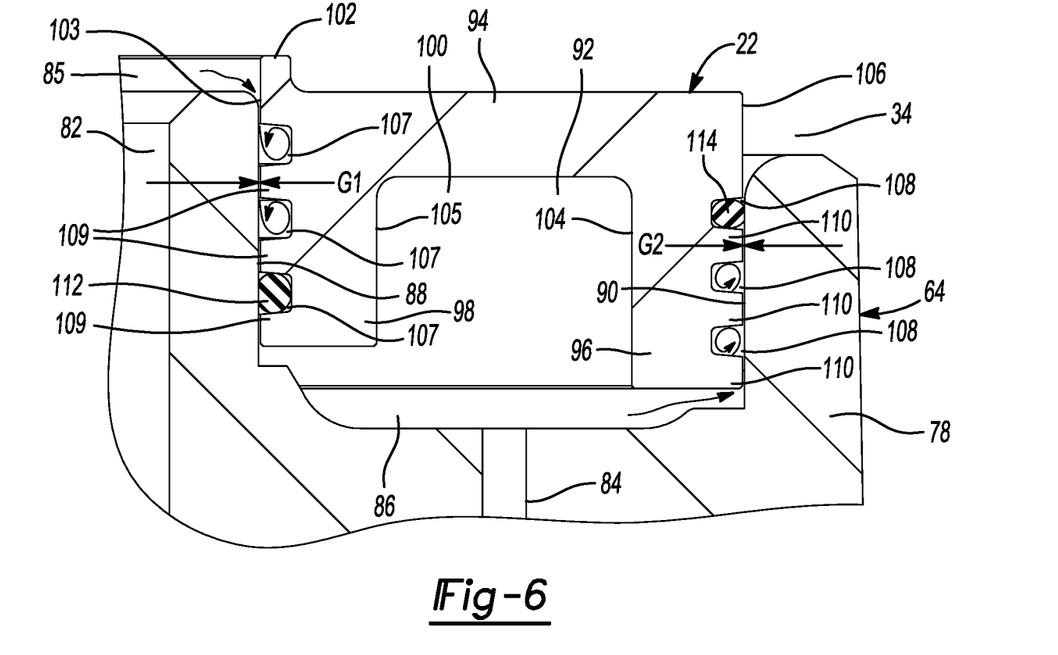
FIG. 6 is a partial cross-sectional view of an alternative floating seal that can be installed on the scroll of the compressor.

FIG. 6 depicts another configuration of the seal 22 in which a first O-ring 112 (i.e., an annular seal) is disposed in one of the first annular grooves 107 and a second O-ring 114 (i.e., an annular seal) is disposed in one of the second annular grooves 108. The first O-ring 112 may sealingly contact the first diametrical surface 88 of the non-orbiting scroll 64 and one or more surfaces of the seal 22 that define the first annular groove 107. The second O-ring 114 may sealingly contact the second diametrical surface 90 of the non-orbiting scroll 64 and one or more surfaces of the seal 22 that define the second annular groove 108.

In the particular configuration shown in FIG. 6, the first O-ring 112 is disposed in the axially lowest one of the first annular grooves 107 (i.e., the first annular groove 107 located closest to the biasing chamber 92), and the second O-ring 114 is disposed in the axially uppermost one of the second annular grooves 108 (i.e., the second annular groove 108 located closest to the suction chamber 34). In some configurations, the first O-ring 112 may reduce or prevent leakage of working fluid from the discharge-pressure region 85 to the biasing chamber 92, and the second O-ring 114 may reduce or prevent leakage of working fluid from the biasing chamber 92 to the suction chamber 34. In some configurations, the seal 22 may include O-rings disposed in more than one of the first annular grooves 107 and/or O-rings disposed in more than one of the second annular grooves 108. The O-rings 112, 114 could have any suitable cross-sectional shape, such as circular, oval, semi-circular, square, rectangular, or lobed, for example.

Figure 7:
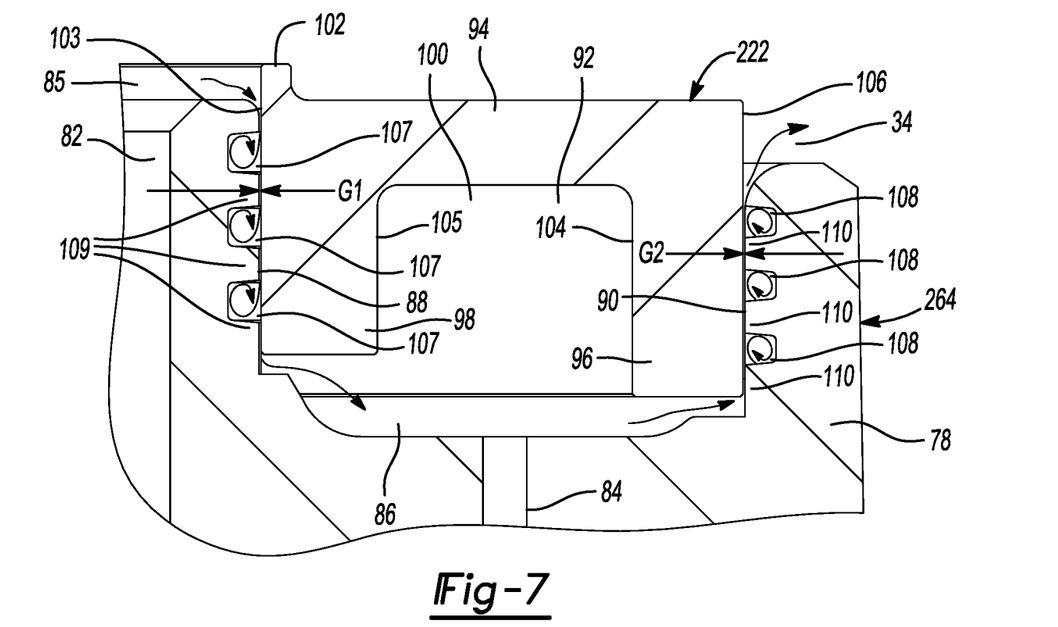
FIG. 7 is a partial cross-sectional view of another alternative floating seal that can be installed on an alternative scroll of the compressor.

FIG. 7 depicts an alternative seal 222 and an alternative non-orbiting scroll 264 that can be incorporated into the compressor 10 instead of the seal 22 and non-orbiting scroll 64 described above. The seal 222 and non-orbiting scroll 264 may be similar or identical to the seal 22 and non-orbiting scroll 64 described above, except that the seal 222 may not include grooves 107, 108. Instead, the grooves 107, 108 may be formed in first and second diametrical surfaces 88, 90, respectively, of the non-orbiting scroll 264, as shown in FIG. 7. In some configurations, a first O-ring (like O-ring 112) may be received in one of the grooves 107 and/or a second O-ring (like O-ring 114) may be received in one of the grooves 108.

In some configurations, the grooves 107 may be formed in the inner diametrical surface 103 of the seal 22, 222 (as shown in FIG. 6) and the grooves 108 may be formed in the second diametrical surface 90 of the non-orbiting scroll 64, 264 (as shown in FIG. 7). In some configurations, the grooves 107 may be formed in the first diametrical surface 88 of the orbiting scroll 64, 264 (as shown in FIG. 7) and the grooves 108 may be formed in the outer diametrical surface 106 of the seal 22, 222 (as shown in FIG. 6).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor comprising:
a first scroll including a first end plate and a first spiral wrap extending from the first end plate, the first end plate defining a biasing passage, a discharge passage and a first annular recess surrounding the discharge passage;
a second scroll including a second end plate and a second spiral wrap extending from the second end plate, the first and second spiral wraps cooperating to define a plurality of fluid pockets therebetween, the fluid pockets decreasing in volume as the fluid pockets move from a radially outer position to a radially intermediate position to a radially inner position;
a seal at least partially received in the first annular recess and cooperating with the first scroll to define a biasing chamber, the biasing chamber in communication with one of the fluid pockets via the biasing passage when the one of the fluid pockets is at the radially intermediate position, the seal including an annular body having an inner diametrical surface and an outer diametrical surface, the inner diametrical surface including a plurality of first annular grooves formed therein, the outer diametrical surface including a plurality of second annular grooves formed therein;
a shell assembly in which the first and second scrolls and the seal are disposed, the shell assembly defining a suction-pressure region and a discharge-pressure region; and
a partition disposed within the shell assembly and separating the suction-pressure region from the discharge-pressure region,
wherein the seal sealingly engages the partition,
wherein at least one of the first annular grooves does not have an annular seal disposed therein,
wherein working fluid from the discharge passage is allowed to flow into the at least one of the first annular grooves to form a turbulent swirling flow within the at least one of the first annular grooves,
wherein at least one of the second annular grooves does not have an annular seal disposed therein, and
wherein working fluid from the biasing chamber is allowed to flow into the at least one of the second annular grooves to form a turbulent swirling flow within the at least one of the second annular grooves.

2. The compressor of claim 1, wherein the first annular recess is defined by a first diametrical surface of the first scroll and a second diametrical surface of the first scroll, wherein the first diametrical surface surrounds the discharge passage, wherein the second diametrical surface surrounds the first diametrical surface, and wherein the seal is disposed radially between the first and second diametrical surfaces of the first scroll.

3. The compressor of claim 2, wherein the inner diametrical surface of the seal cooperates with the first diametrical surface of the first scroll to define a first leakage path between the discharge-pressure region and the biasing chamber, and wherein the outer diametrical surface of the seal cooperates with the second diametrical surface of the first scroll to define a second leakage path between the biasing chamber and the suction-pressure region while the seal sealingly engages the partition.

4. The compressor of claim 3, wherein the first leakage path includes the first annular grooves formed in the seal such that fluid from the discharge-pressure region is able to flow into the first annular grooves, and wherein the second leakage path includes the second annular grooves formed in the seal such that fluid from the biasing chamber is able to flow into the second annular grooves.

5. The compressor of claim 1, wherein the seal includes an annular lip that extends axially toward the partition and sealingly engages the partition.

6. The compressor of claim 1, wherein the first and second annular grooves have trapezoidal cross sections.

7. The compressor of claim 1, wherein the seal includes a second annular recess disposed radially between the inner and outer diametrical surfaces of the seal, and wherein the second annular recess forms a portion of the biasing chamber.

8. The compressor of claim 1, wherein the seal is formed from a metallic material.

9. The compressor of claim 1, wherein the seal includes a polymeric coating.

10. The compressor of claim 1, wherein the seal is a single, unitary body.

11. The compressor of claim 1, wherein the first scroll is axially movable relative to the seal.

12. The compressor of claim 1, further comprising:
a first O-ring disposed within one of the first annular grooves; and
a second O-ring disposed within one of the second annular grooves.

13. A compressor comprising:
a first scroll including a first end plate and a first spiral wrap extending from the first end plate, the first end plate defining a discharge passage and a first annular recess surrounding the discharge passage;
a second scroll including a second end plate and a second spiral wrap extending from the second end plate, the first and second spiral wraps cooperating to define a plurality of fluid pockets therebetween;
a one-piece seal at least partially received in the first annular recess and cooperating with the first scroll to define a biasing chamber receiving fluid at an intermediate pressure that is less than a discharge pressure and greater than a suction pressure, the seal including a plurality of first annular grooves and a plurality of second annular grooves, the first annular grooves surrounding the discharge passage, the second annular grooves are disposed radially outward relative to the first annular grooves;
a shell assembly in which the first and second scroll and the seal are disposed, the shell assembly defining a suction-pressure region and a discharge-pressure region; and
a partition disposed within the shell assembly and separating the suction-pressure region from the discharge-pressure region,
wherein the seal sealingly engages the partition,
wherein at least one of the first annular grooves does not have an annular seal disposed therein,
wherein working fluid from the discharge passage is allowed to flow into the at least one of the first annular grooves to form a turbulent swirling flow within the at least one of the first annular grooves,
wherein at least one of the second annular grooves does not have an annular seal disposed therein,
wherein working fluid from the biasing chamber is allowed to flow into the at least one of the second annular grooves to form a turbulent swirling flow within the at least one of the second annular grooves.

14. The compressor of claim 13, wherein the first annular recess is defined by a first diametrical surface of the first scroll and a second diametrical surface of the first scroll, wherein the first diametrical surface surrounds the discharge passage, wherein the second diametrical surface surrounds the first diametrical surface, and wherein the seal is disposed radially between the first and second diametrical surfaces of the first scroll.

15. The compressor of claim 14, wherein an inner diametrical surface of the seal cooperates with the first diametrical surface of the first scroll to define a first leakage path between the discharge-pressure region and the biasing chamber, and wherein an outer diametrical surface of the seal cooperates with the second diametrical surface of the first scroll to define a second leakage path between the biasing chamber and the suction-pressure region while the seal sealingly engages the partition.

16. The compressor of claim 15, wherein the first leakage path includes the first annular grooves formed in the seal such that fluid from the discharge-pressure region is able to flow into the first annular grooves, and wherein the second leakage path includes the second annular grooves formed in the seal such that fluid from the biasing chamber is able to flow into the second annular grooves.

17. The compressor of claim 15, wherein the seal includes a second annular recess disposed radially between the inner and outer diametrical surfaces of the seal, and wherein the second annular recess forms a portion of the biasing chamber.

18. The compressor of claim 13, wherein the seal includes an annular lip that extends axially toward the partition and sealingly engages the partition.

19. The compressor of claim 13, wherein the first and second annular grooves have trapezoidal cross sections.

20. The compressor of claim 13, wherein the seal is formed from a metallic material.

21. The compressor of claim 13, wherein the seal is formed from a first material and includes a coating comprising a second material that is different than the first material.

22. The compressor of claim 13, wherein the first scroll is axially movable relative to the seal.

23. The compressor of claim 13, further comprising:
a first O-ring disposed within one of the first annular grooves; and
a second O-ring disposed within one of the second annular grooves.

24. A compressor comprising:
a first scroll including a first end plate and a first spiral wrap extending from the first end plate, the first end plate defining a biasing passage, a discharge passage and a first annular recess surrounding the discharge passage, the first annular recess including a first diametrical surface and a second diametrical surface, the second diametrical surface disposed radially outward relative to the first diametrical surface;
a second scroll including a second end plate and a second spiral wrap extending from the second end plate, the first and second spiral wraps cooperating to define a plurality of fluid pockets therebetween, the fluid pockets decreasing in volume as the fluid pockets move from a radially outer position to a radially intermediate position to a radially inner position;

a seal at least partially received in the first annular recess radially between the first and second diametrical surfaces of the first annular recess, the seal and the first scroll cooperating with each other to define a biasing chamber, the biasing chamber in communication with one of the fluid pockets via the biasing passage when the one of the fluid pockets is at the radially intermediate position, the seal including an annular body having an inner diametrical surface and an outer diametrical surface;

a shell assembly in which the first and second scrolls and the seal are disposed, the shell assembly defining a suction-pressure region and a discharge-pressure region; and a partition disposed within the shell assembly and separating the suction-pressure region from the discharge-pressure region, wherein a plurality of first annular grooves are formed in one of the first diametrical surface of the first scroll and the inner diametrical surface of the seal, wherein a plurality of second annular grooves are formed in one of the second diametrical surface of the first scroll and the outer diametrical surface of the seal, wherein at least one of the first annular grooves does not have an annular seal disposed therein, wherein working fluid from the discharge passage is allowed to flow into the at least one of the first annular grooves to form a turbulent swirling flow within the at least one of the first annular grooves, wherein at least one of the second annular grooves does not have an annular seal disposed therein, wherein working fluid from the biasing chamber is allowed to flow into the at least one of the second annular grooves to form a turbulent swirling flow within the at least one of the second annular grooves, and wherein the seal sealingly engages the partition.

25. The compressor of claim 24, wherein the first annular grooves are formed in the first diametrical surface of the first scroll and the second annular grooves are formed in the second diametrical surface of the first scroll.

26. The compressor of claim 24, wherein the first annular grooves are formed in the inner diametrical surface of the seal and the second annular grooves are formed in the outer diametrical surface of the seal.

27. The compressor of claim 24, wherein the seal includes an annular lip that extends axially toward the partition and sealingly engages the partition.

28. The compressor of claim 24, wherein the inner diametrical surface of the seal cooperates with the first diametrical surface of the first scroll to define a first leakage path between the discharge-pressure region and the biasing chamber, and wherein the outer diametrical surface of the seal cooperates with the second diametrical surface of the first scroll to define a second leakage path between the biasing chamber and the suction-pressure region while the seal sealingly engages the partition.

29. The compressor of claim 28, wherein the first leakage path includes the first annular grooves such that fluid from the discharge-pressure region is able to flow into the first annular grooves, and wherein the second leakage path includes the second annular grooves such that fluid from the biasing chamber is able to flow into the second annular grooves.

30. The compressor of claim 24, wherein the first and second annular grooves have trapezoidal cross sections.

31. The compressor of claim 24, wherein the seal includes a second annular recess disposed radially between the inner and outer diametrical surfaces of the seal, and wherein the second annular recess forms a portion of the biasing chamber.

32. The compressor of claim 24, wherein the seal is formed from a metallic material.

33. The compressor of claim 24, wherein the seal includes a polymeric coating.

34. The compressor of claim 24, wherein the seal is a single, unitary body.

35. The compressor of claim 24, wherein the first scroll is axially movable relative to the seal.

36. The compressor of claim 24, further comprising:
a first O-ring disposed within one of the first annular grooves; and
a second O-ring disposed within one of the second annular grooves.

* * * * *